US009533629B2

(12) United States Patent
Ksiezopolski et al.

(10) Patent No.: US 9,533,629 B2
(45) Date of Patent: *Jan. 3, 2017

(54) COMBINATION SPLASH SEAL AND WEAR BAR

(71) Applicant: Lifetime Industries, Inc., Modesto, CA (US)

(72) Inventors: Edwin E. Ksiezopolski, Granger, IN (US); Kevin J. Ksiezopolski, Granger, IN (US)

(73) Assignee: Lifetime Industries, Inc., Modesto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/959,840

(22) Filed: Dec. 4, 2015

(65) Prior Publication Data
US 2016/0159294 A1    Jun. 9, 2016

Related U.S. Application Data

(63) Continuation-in-part of application No. 14/563,146, filed on Dec. 8, 2014.

(60) Provisional application No. 61/912,687, filed on Dec. 6, 2013.

(51) Int. Cl.
B60R 13/06 (2006.01)
F16J 15/02 (2006.01)
B60P 3/34 (2006.01)
F16J 15/06 (2006.01)
F16J 15/04 (2006.01)

(52) U.S. Cl.
CPC ............ *B60R 13/06* (2013.01); *F16J 15/022* (2013.01); *F16J 15/04* (2013.01); *F16J 15/061* (2013.01)

(58) Field of Classification Search
CPC ............ B60P 3/34; B60P 3/341; B60R 13/06; B60J 10/24; B60J 10/246; F16J 15/022; F16J 15/025; F16J 15/027
See application file for complete search history.

(56) References Cited

U.S. PATENT DOCUMENTS

| 4,448,430 A | * | 5/1984 | Bright | B60J 10/84 |
| | | | | 277/642 |
| 5,226,277 A | * | 7/1993 | Beckmann | B60J 10/80 |
| | | | | 24/31 C |
| 6,966,590 B1 | * | 11/2005 | Ksiezopolki | B60P 3/34 |
| | | | | 296/165 |
| 7,380,854 B1 | * | 6/2008 | Hanser | B60P 3/34 |
| | | | | 296/26.12 |
| 7,540,116 B1 | * | 6/2009 | Martinson | B60P 3/34 |
| | | | | 277/644 |
| 7,651,144 B2 | * | 1/2010 | Clark | B60P 3/34 |
| | | | | 277/644 |

(Continued)

Primary Examiner — Vishal Patel
Assistant Examiner — Nicholas L Foster
(74) Attorney, Agent, or Firm — Botkin & Hall, LLP

(57) ABSTRACT

A seal assembly is mounted to a floor portion of an RV with a slide out room. The slide out room has a wall and a floor that is separated from the floor of the RV. The seal assembly has a wear bar with a ramped surface extending up from a flange at an obtuse angle, terminating in a flat top surface which then terminates in a wall that extends downwardly to another flange. The seal has a flexible wiper that seals to the slide out room floor. The seal assembly includes a splash shield with a resilient end that seals to the wall of the slide out room.

19 Claims, 10 Drawing Sheets

(56) References Cited

U.S. PATENT DOCUMENTS

| | | | | |
|---|---|---|---|---|
| 8,408,625 | B1 * | 4/2013 | Ksiezopolski | B60P 3/34 296/171 |
| 8,910,422 | B2 * | 12/2014 | Siegel | B60P 3/32 277/649 |
| 9,033,390 | B1 * | 5/2015 | Ksiezopolski | B60R 13/06 296/26.13 |
| D741,231 | S * | 10/2015 | Schoonover | D12/106 |
| 2002/0089213 | A1 * | 7/2002 | Gehman | B60P 3/34 296/171 |
| 2006/0091687 | A1 * | 5/2006 | Schoffner | B60P 3/34 296/26.01 |
| 2008/0048464 | A1 * | 2/2008 | Ksiezopolski | B60P 3/34 296/26.01 |
| 2008/0073925 | A1 * | 3/2008 | Ksiezopolski | B60P 3/34 296/26.01 |
| 2012/0079771 | A1 * | 4/2012 | Meulemans | E06B 7/2305 49/484.1 |
| 2013/0269262 | A1 * | 10/2013 | Siegel | B60R 13/08 49/492.1 |
| 2014/0001710 | A1 * | 1/2014 | Siegel | B60R 13/06 277/630 |
| 2014/0097578 | A1 * | 4/2014 | Young | F16J 15/027 277/628 |
| 2014/0203522 | A1 * | 7/2014 | Ksiezopolski | F16J 15/027 277/634 |
| 2015/0260287 | A1 * | 9/2015 | Young | F16J 15/027 277/312 |
| 2016/0003358 | A1 * | 1/2016 | Young | F16J 15/027 277/645 |
| 2016/0159294 | A1 * | 6/2016 | Ksiezopolski | B60R 13/06 277/637 |

\* cited by examiner

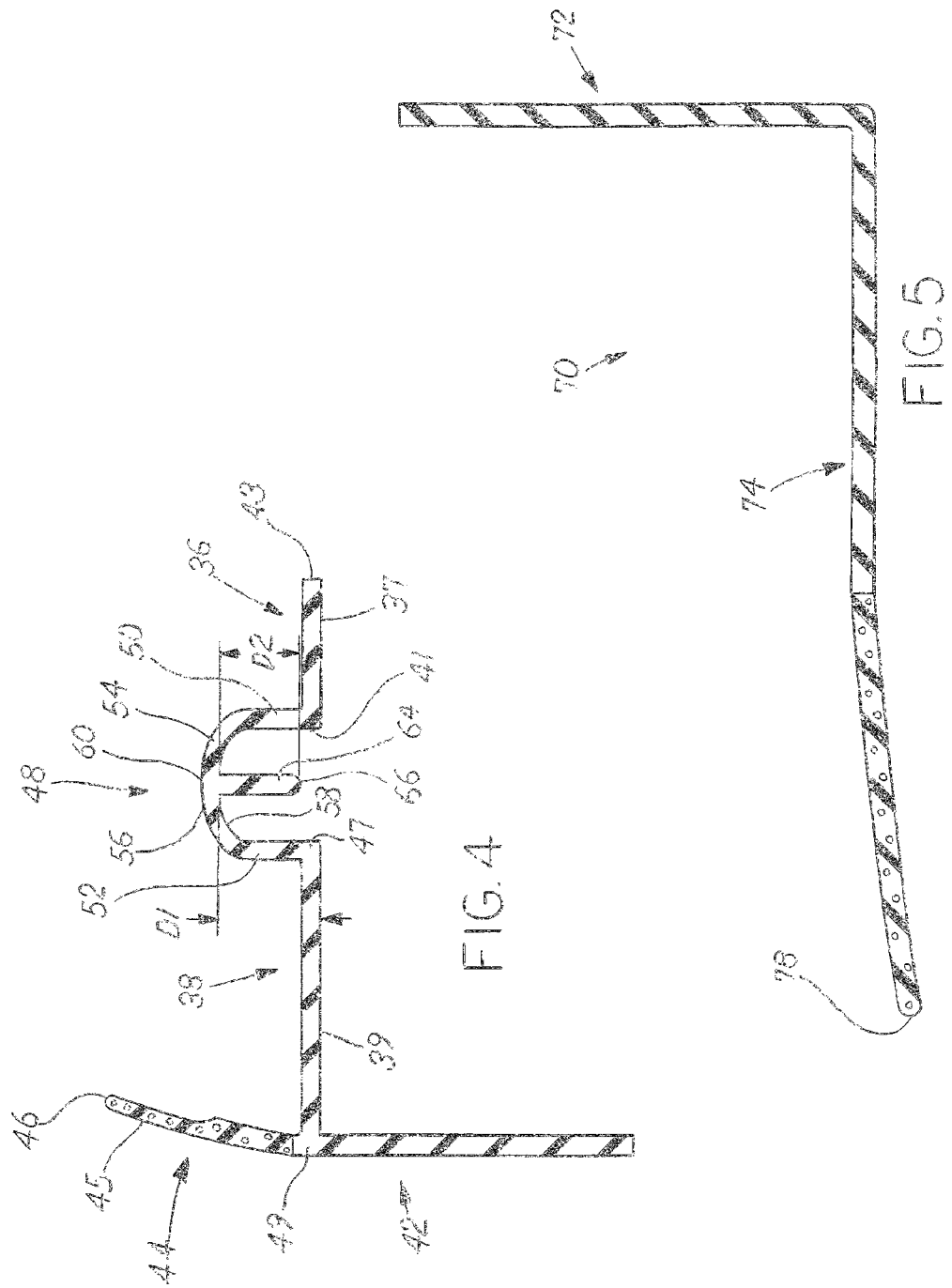

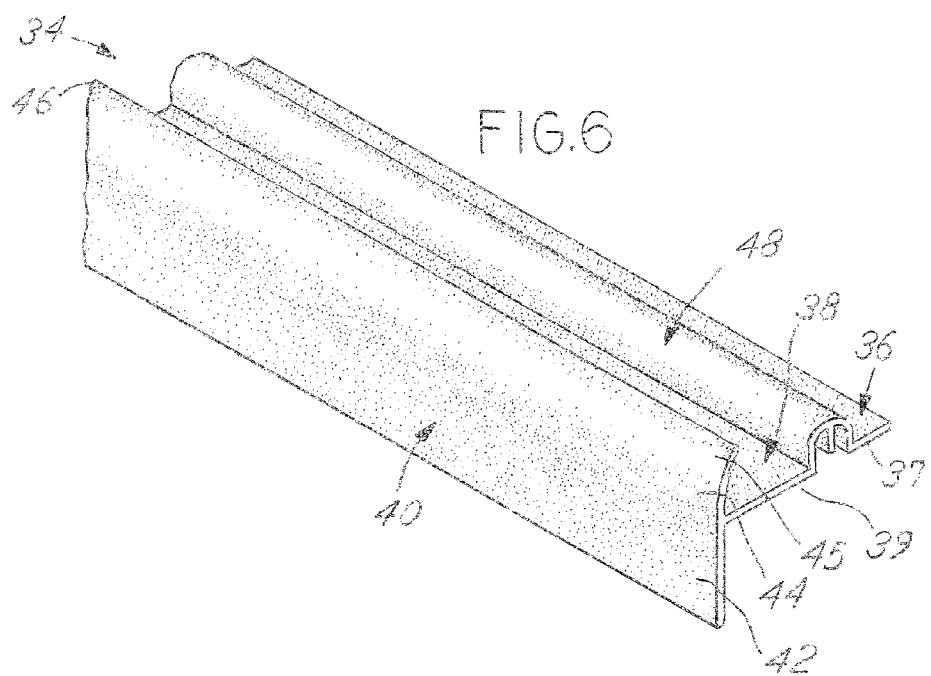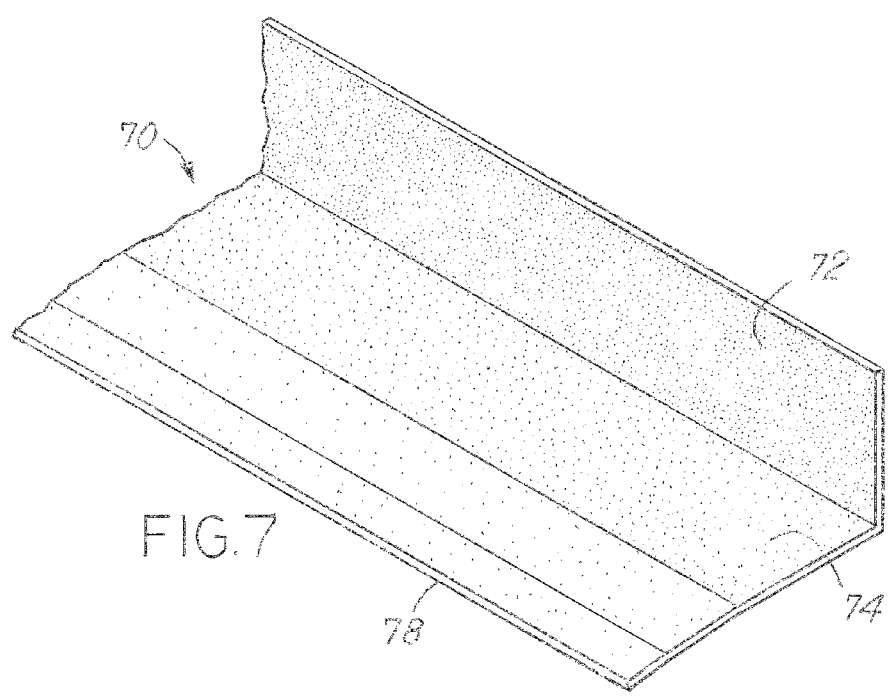

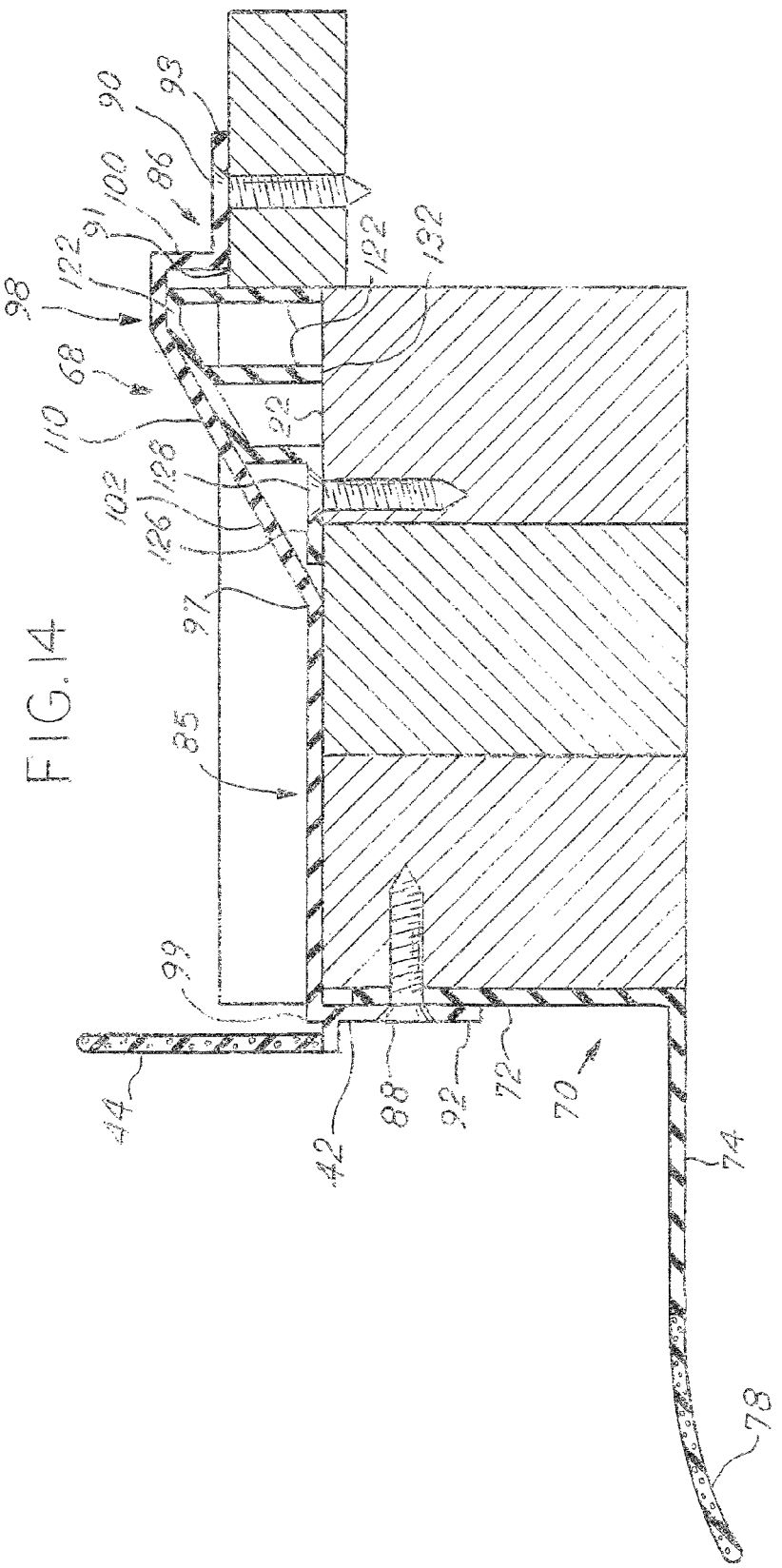

COMBINATION SPLASH SEAL AND WEAR BAR

CROSS REFERENCE TO RELATED APPLICATIONS

This application is a Continuation-in-Part of U.S. application Ser. No. 14/563,146, filed Dec. 8, 2014, which claims priority of U.S. Provisional application 61/912,687, filed Dec. 6, 2013, which application hereby incorporated in its entirety by reference.

BACKGROUND OF THE INVENTION

Slide out rooms are commonly used to expand the usable space within a recreational vehicle ("RV"). It is important that the slide out room be sealed from the exterior of the vehicle. Inadequately sealed slide out rooms create a perception in an end user's mind that the vehicle is low quality. Gaps between parts of the slide out room and the RV create opportunity for drafts, rodents, insects, water, debris, or other undesirable elements to enter the interior of the RV. Evidence of an inadequately sealed slide out room may be light showing around where the slide out room interfaces with main RV interior, drafts around the slide out room, or water entering the RV from around the slide out room.

It is particularly difficult to effectively seal the lower portion of a slide out room. There is ample opportunity for seals near this area of the slide out room to be breached by light, air, or water. Water may be thrown up into the room during travel along roads. There is a need to prevent water from being splashed or thrown into the slide out room from below during travel.

SUMMARY OF THE INVENTION

The present disclosure describes a seal assembly that is made up of two pieces. The first piece is designed to seal the main floor of the RV to the floor of the slide out room with an upper portion where a resilient wiper slides along the bottom of the slide out room floor. The first piece includes a wear bar made from a higher durometer that also slides along the slide out room floor. The second piece is designed to seal the floor of the RV to the side wall of the slide out room by having a sealing leg that mates to the side wall when the slide out room is in the refracted position.

BRIEF DESCRIPTION OF THE DRAWINGS

FIG. 4 is a side view of the floor portion of the seal show in FIG. 3;

FIG. 5 is a side view of the splash portion of the seal shown in FIG. 3;

FIG. 6 is a perspective view of the floor portion of the seal shown in FIG. 4;

FIG. 7 is a perspective view of the splash portion of the seal shown in FIG. 5;

FIG. 14 is a side view of a ramped floor portion that has a separate support member beneath the wear bar.

DESCRIPTION OF THE PREFERRED EMBODIMENT

Figure 1:
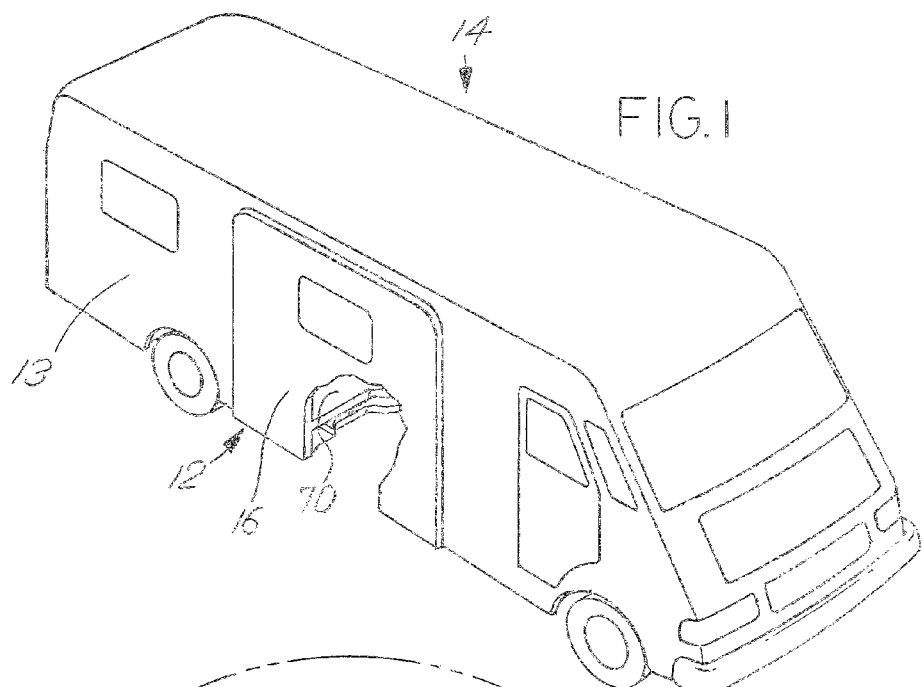
FIG. 1 is a perspective view of an RV having a slide out room.
Figure 2:
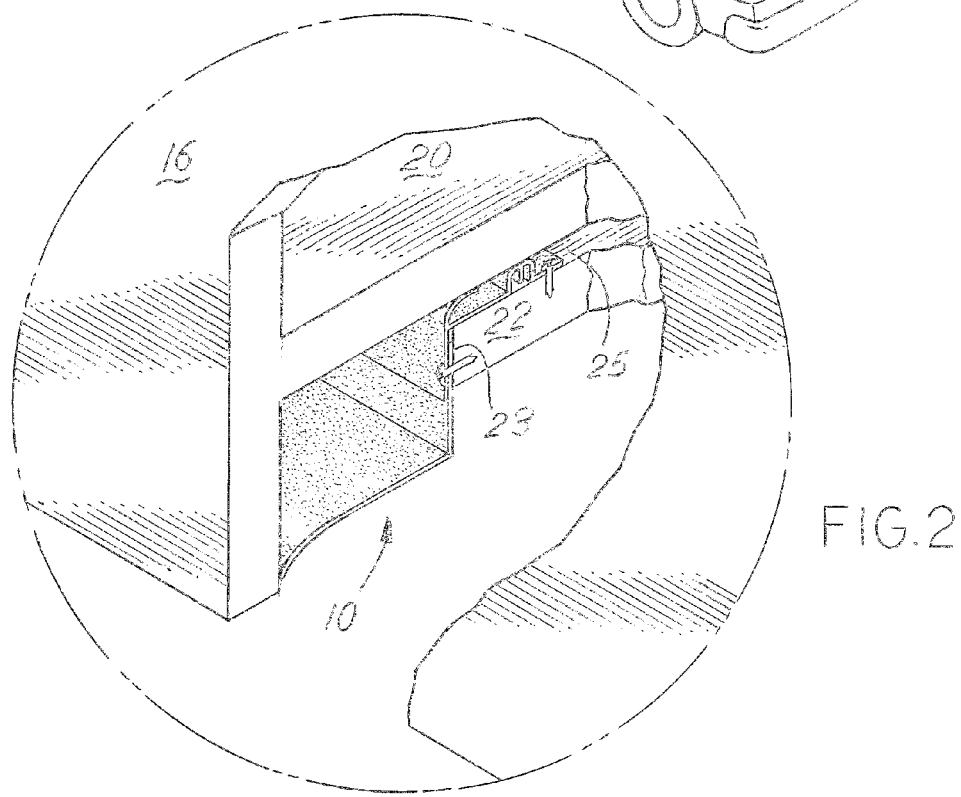
FIG. 2 is a magnified view taken about area 2 in FIG. 1.

The present invention is a seal 10 useful for sealing beneath a slide out room 12 in a recreational vehicle ("RV") 14. The slide out room 12 is slidably retained in an opening in sidewall 13 of the RV 14. The slide out room 12 has an end wall 16 that faces the exterior of the RV 14 and overlaps the sidewall 13 of the RV 14. The end wall 16 is shown in FIG. 2. The end wall 16 is attached to a slide out room floor 20 that slides over a main floor 22 that serves as the floor of the recreational vehicle. The main floor 22 has an outermost edge 23 that defines the outermost portion of the floor 20. The end wall 16 is also connected to slide out room sidewalls and a roof (that are not shown) to form the slide out room 12. The slide out room 12 is slidable from a retracted position as shown in FIGS. 1 and 2 to an extended position that places the end wall 16 at a distance further spaced from the sidewall 13 of the recreational vehicle. The extended position is not shown.

The slide room floor 20 is spaced from the main floor 22 as the slide out room floor 20 slides over the main floor 22 to shift between the extended and retracted positions. FIGS. 2 and 4 show the space 25 between the main floor 22 and the slide out room floor 20. The seal 10 of the present invention is located at least partially in this space 25.

FIG. 4 shows a floor portion 34 of the seal 10 that is mounted to the main floor 22. The floor portion 34 has an inward flange 36 and an outward flange 38 that are integral and joined to a wear bar 48. The inward flange 36 has a lower surface 37 that is coplanar with a lower surface 39 on the outward flange 38. Both of the flanges 36, 38 are collinear with each other and the lower surfaces 37, 39 are coplanar. Flange 36 has a first terminal end 41 and a second terminal end 43. Flange 38 has a first terminal end 47 and a second terminal end 49. The exterior leg 40, which is attached to the second terminal end 49 of the outward flange 38, has a lower portion 42 that is adapted for locating the floor portion 34 along the outermost edge 23 of the main floor 22. The lower portion 42 is made of a relatively high durometer elastomeric material and is the same material as the inward and outward flanges 36, 38. An upper portion 44 of the exterior leg 40 extends upwardly and opposite to the lower portion 42. The upper portion 44 is coplanar and collinear with the lower portion 42 where the two meet. As will be discussed further, this having the upper portion 44 and lower portion 42 of the exterior leg 40 be collinear is not necessary. The upper portion 44 has a thinned section 45 near the distal end 46. The thinned section 45 near the distal end 46 provides for a very flexible tip that is suitable for rubbing in a sealing fashion against the slide out room floor 20. The upper portion 44 of the exterior leg 40 is resilient and more flexible than the lower portion 42. The upper portion 44, in addition to being thinned, may also be made of a lower durometer material, as is the case in the floor portion 34 shown in FIG. 4.

Figure 3:
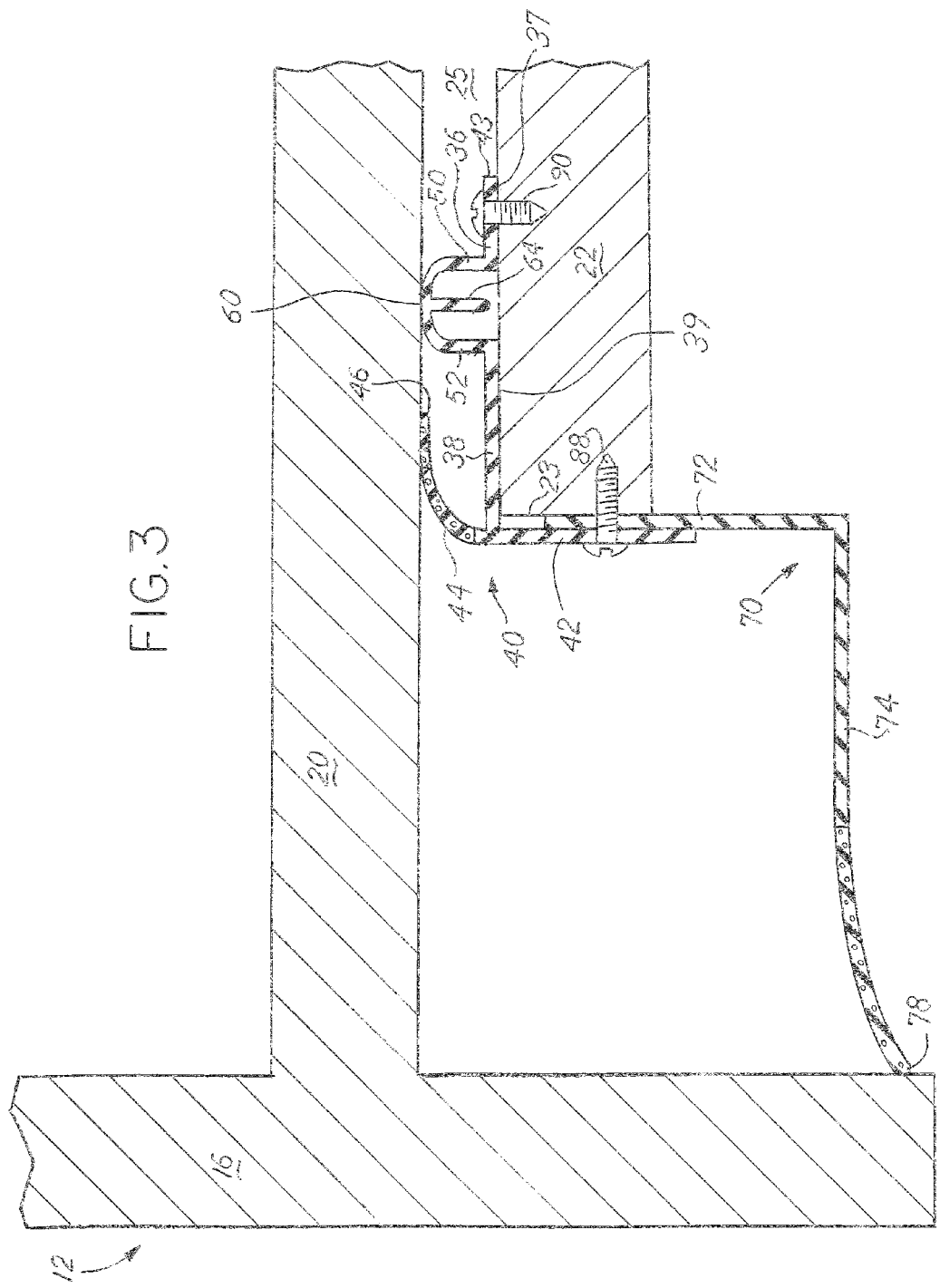
FIG. 3 is a side view of the slide out room in a retracted position over the main floor.

The inward flange 36 and outward flange 38 are separated by the wear bar 48. The wear bar 48 has an inward upright member 50 and an outward upright member 52. The inward and outward upright members 50, 52 are perpendicular to the inward flange 36 and outward flange 38 and extend upwardly opposite the lower surfaces 37, 39. The inward and outward flanges 36, 38 are integrally joined to the upright members 50, 52 at their respective terminal ends 41, 47 so that no part of the flanges 36, 38 extend beyond the upright members 50, 52. The upright members 50, 52 terminate in an arcuate top 54 that is integrally joined to the upright members 50 and 52. The arcuate top 54 has an upper surface 56 and a lower surface 58. The lower surface 58 of the arcuate top 54 is spaced away from the lower surfaces 37, 39 of the flanges 36, 38. Therefore, there is a predetermined distance D1 between the lower surface 58 of the arcuate top 54 and the plane formed by the coplanar lower surfaces 37, 39. The plane on which the coplanar lower surfaces 37, 39 rest is the main floor 22. Thus, the lower surface 58 of the arcuate top 54 is spaced from the main floor 22 by predetermined distance D1 when installed. The arcuate top 54 has a peak 60 that is evenly spaced between the upright members 50, 52. The peak 60 forms the farthest point of the wear bar 48 above the main floor 22 when installed as shown in FIG. 3. The peak 60 is the farthest location from the lower surfaces 37, 39 on the wear bar 48 and is located at the approximate midpoint of the arcuate top 54.

Figure 12:
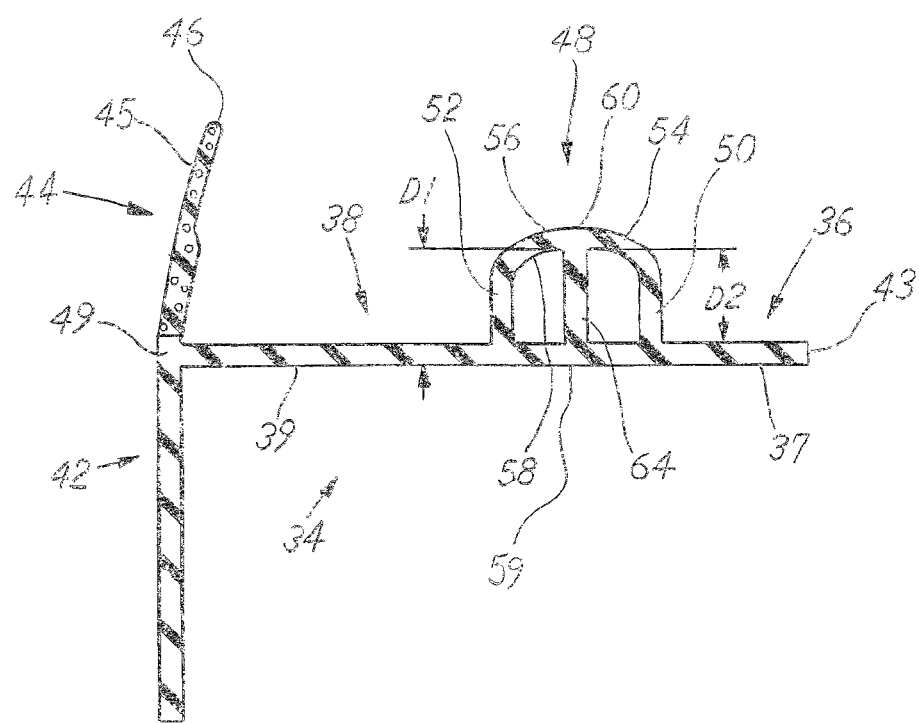
FIG. 12 is a side view of the seal shown in FIG. 4, with the addition of a bridge.

The wear bar 48 includes a strut 64 that extends from the lower surface 58 toward the lower surfaces 37, 39 of flanges 36, 38. FIG. 4 shows the strut 64. The strut 64 has a distal end 66 that is farthest from the lower surface 58 to which the strut 64 is attached. The distal end 66 is a predetermined distance D2 from the lower surface 58. Because the distal end 66 is nearer the lower surface of the arcuate top 58 than lower surfaces 37, 39, the strut 64 does not contact the main floor 22 when the wear bar 48 is in an undeformed condition as shown in FIG. 4. In other words, the strut 66 is shorter than the height of the lower surface 58 of the arcuate top 54 above the main floor 22. Under enough force, it may be possible to deform the wear bar 48 so that the strut 66 does touch the main floor 22. The strut 64 can provide some additional support for the floor 20 when it is deformed sufficiently for the strut 64 to contact the main floor 22. In the case of the wear bar 48 shown in FIG. 12, a bridge 59 spans between the inward and outward flanges 36, 38. The wear bar 48 in FIG. 12, has the strut 64 connected to the bridge 59. As such, the wear bar 48 shown in FIG. 12 is more rigid than that shown in FIG. 4. In this case, the strut 64 provides constant support for the top of the wear bar 48.

In addition to a floor portion 34, the seal 10 has a splash portion 70 that is adapted for sealing against the end wall 16. The splash portion 70 is L-shaped having a mounting leg 72 integrally joined to a sealing leg 74. The mounting leg 72 and approximately half of the sealing leg 74 are made of the same durometer material. The mounting leg 72 is adapted for being mounted to the outermost edge 23 of the main floor 22. The sealing leg 74 is made of a lower durometer material near its distal end 78. The portion of the sealing leg 74 nearest the distal end 78 is resilient and more flexible than the portion of the sealing leg 74 nearest the mounting leg 72. FIG. 5 shows the differently hatched sections indicating the aforementioned portions of the sealing leg 74. The distal end 78 is adapted for flexibly sealing against the end wall 16 of the slide out room 12 when the slide out room 12 is in its retracted position as shown in FIG. 2.

The seal 10 is installed as shown in FIG. 3. The lower surfaces 37, 39 of the inward and outward flanges 36, 38 rest upon the main floor 22. The splash portion 70 of the seal 10 is placed so the mounting leg 72 is between the lower portion 42 of the floor portion 34 and the edge 23 of the main floor 22. As shown in FIG. 3, a single fastener 88 can extend through both the lower portion 42 and the mounting leg 72 to hold the seal 10 to the RV. The sandwiching of the mounting leg 72 allows the weight of the sealing leg 74 and any force applied to the distal end 78 to be distributed across the lower portion 42 and not directly to the fastener 88. An additional fastener 90 may be driven though the inward flange 36 into the main floor 22. The fasteners 88, 90 may be screws, nails, staples, or other suitable fasteners. In its installed position, the splash portion 70 will seal against the end wall 16 to prevent water or other debris from entering the slide out room 12 from below.

Figure 8:
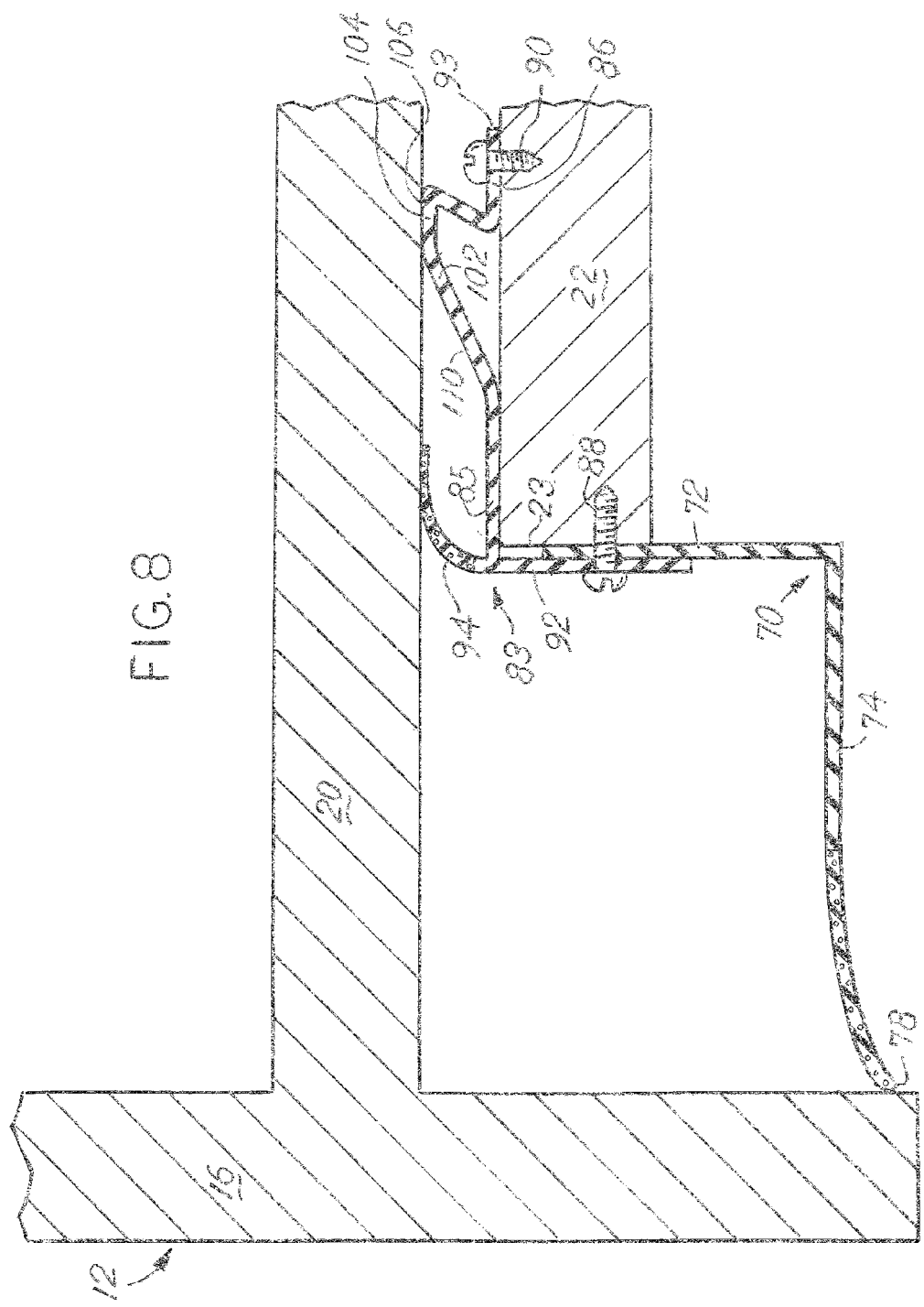
FIG. 8 is a side view of the slide out room in a retracted position over the main floor.
Figure 9:
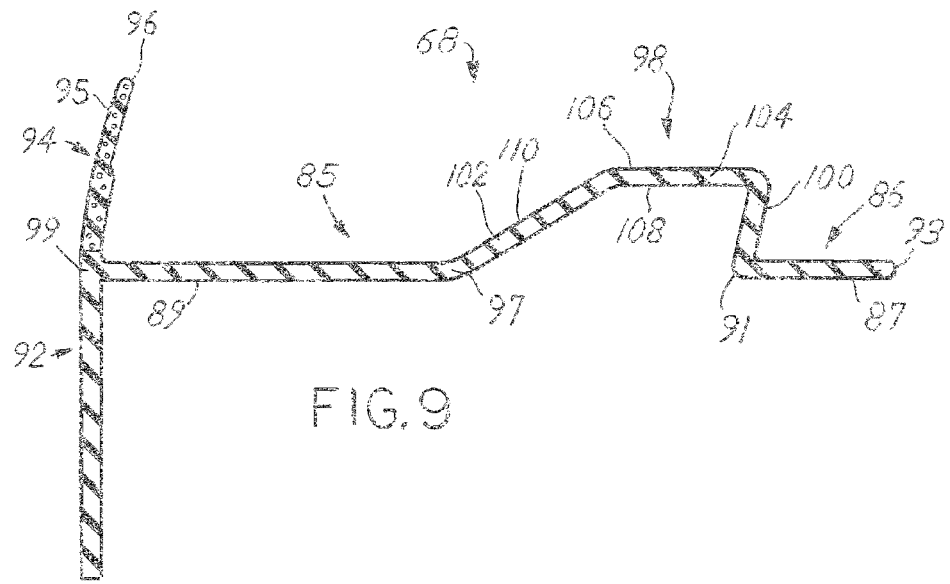
FIG. 9 is a side view of the floor portion of the seal shown in FIG. 8.
Figure 10:
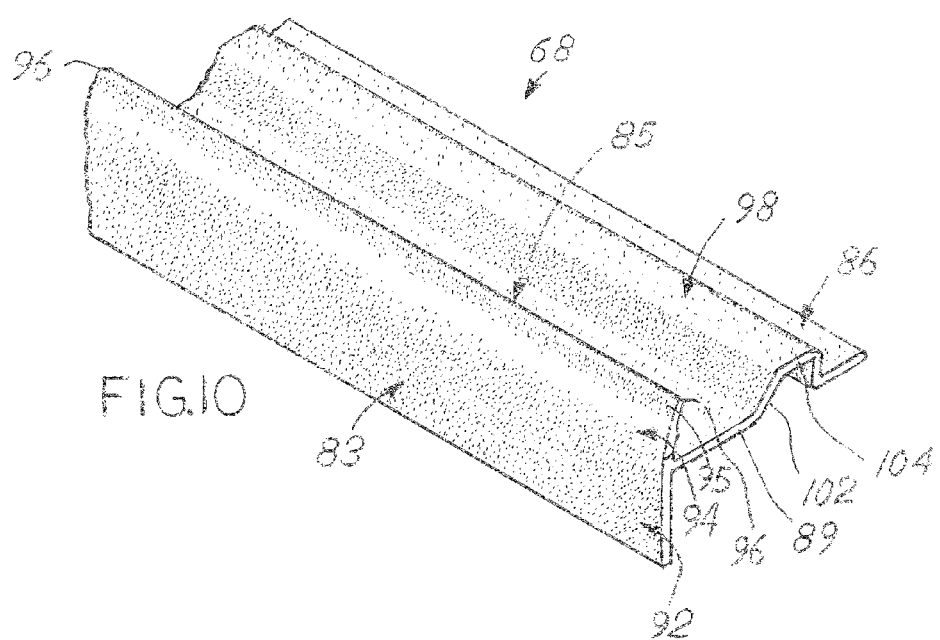
FIG. 10 is a perspective view of the floor portion of the seal shown in FIG. 8.

An alternate embodiment of the floor portion 34 has a ramped floor portion 68 in FIGS. 9-10; 13 and 14. The ramped floor portion 68 is well suited for use with a flush floor slide-out, where the floor 20 of the slide-out drops down when fully extended, removing a step up area when the user moves between the main floor to the fully-extended slide-out floor. The ramped floor portion 68 has an inward flange 86 and an outward flange 85 that are integral and continues with an exterior leg 83 as shown in FIG. 10. The inward flange 86 has a lower surface 87 that is coplanar with a lower surface 89 on the outward flange 85. Both of the flanges 86, 85 are collinear with each other and the lower surfaces 87, 89 are coplanar. However, it is not necessary that flanges 86 and 85 are collinear, as shown in FIG. 14. Flange 86 has a first terminal end 91 and a second terminal end 93. Flange 85 has a first terminal end 97 and a second terminal end 99 as shown in FIG. 9. The exterior leg 83, which is attached to the second terminal end 99 of the outward flange 85, has a lower portion 92 that is adapted for locating the ramped floor portion 68 along the outermost edge 23 of the main floor 22 as shown in FIG. 8.

The lower portion 92 is made of a relatively high durometer elastomeric material, similarly to the lower portion 92. An upper portion 94 of the exterior leg 83 extends upwardly and opposite to the lower portion 92. The upper portion 94 is more flexible than the lower portion 92 and coplanar and collinear with the lower portion 92 where the two meet. As mentioned before, it is not necessary that the upper portion 94 and lower portion 92 are collinear. The upper portion 94 has a thinned section 95 as shown in FIG. 9 near the distal end 96. The thinned section 95 near the distal end 96 provides for a very flexible tip that is suitable for rubbing in a sealing fashion against the slide out room floor 20. The upper portion 94 of the exterior leg 83 is resilient and more flexible than the lower portion 92.

As is shown in FIG. 9, the inward flange 86 and outward flange 85 are separated by a wear bar 98. The wear bar 98 has an inward upright member 100 and an outward ramped member 102. The outward ramped member 102 had a ramped surface 110. The inward upright member 100 and outward ramped member 102 are angled with respect to flanges 86, 85 and extend upwardly opposite the lower surfaces 87, 89. The inward and outward flanges 86, 85 are integrally joined to inward and outward members 100, 102 at their respective terminal ends 91, 97 so that no part of the flanges 86, 85 extend beyond the members 100, 102. The inward and outward members 100, 102 terminate in a flat top 104 that is integrally joined to members 100, 102. The flat top 104 has an upper surface 106 and a lower surface 108. The lower surface 108 of the flat top 104 is spaced away from the lower surfaces 87, 89 of the flanges. As shown in FIG. 9, the inward upright member 100 is acutely angled with respect to the inward flange 86, but it is contemplated that it could be perpendicular. The outward ramped member 102 as shown in FIG. 10, is obtusely angled with respect to the outward flange 85. Due to the angles of the outward ramped member 102 and the inward upright member 100, when pressure is placed on the top 104, it tends to bend inwardly. An additional fastener 90 as shown in FIG. 8 may be driven though the inward flange 86 into the main floor 22. The fasteners 88, 90 may be screws, nails, staples, or other suitable fasteners. In its installed position, the splash portion 70 will seal against the end wall 16 to prevent water or other debris from entering the slide out room 12 from below.

Figure 13:
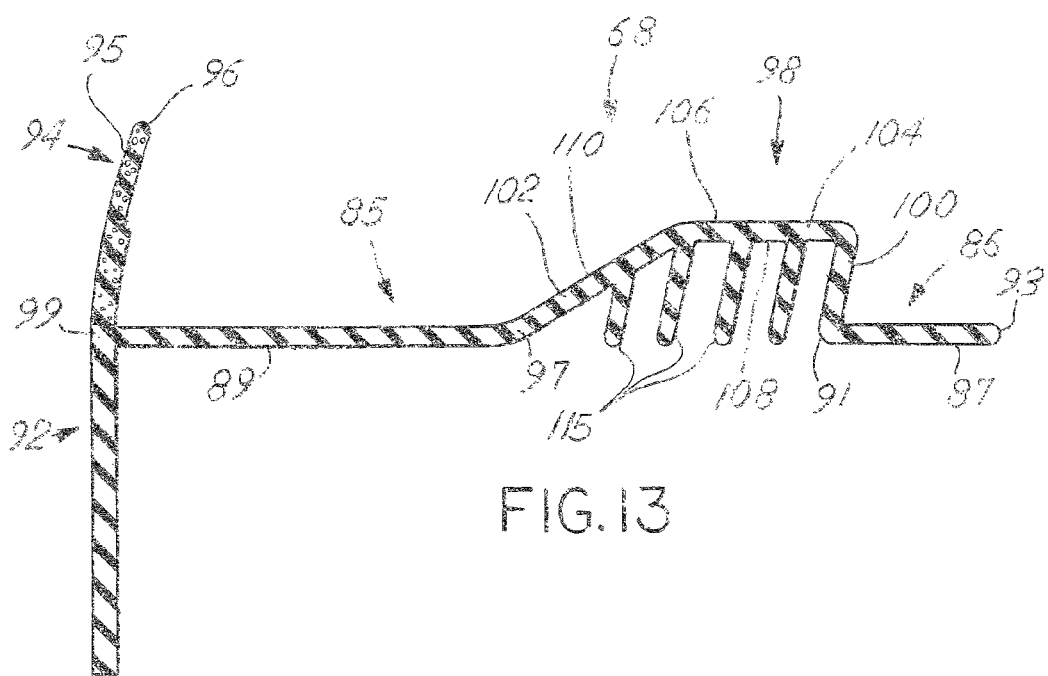
FIG. 13 is a side view of a ramped floor portion.

The ramped floor portion 68 as shown in FIG. 13 includes support ribs 115 integrally extending from the lower surface 108 of the wear bar. The support ribs support the upper surface 106 of the wear bar 98. The support ribs 115 are angled in parallel with the inward upright member 100. As such, downward force that may deflect the wear bar 98 will tend to bend the wear bar 98 inwardly toward the inward flange 86.

In some cases, it may be desirable to have support for the wear bar 98 that is not integrally attached to the wear bar 98. In such a case, a separate support member 120 may be inserted beneath the wear bar 98 as shown in FIG. 14. The separate support member 120 is an extrusion that extends longitudinally beneath the wear bar 98 in a complementary fashion and includes its own support ribs 122 that effectively rigidify the wear bar 98 of the ramped floor portion 68. The separate support member 120 includes a support ledge 126 that may receive fasteners 128 such as screws that hold the support member 120 in place while the ramped floor portion 68 is placed over it. A lower surface 127 of said support ledge 126 is adapted to rest upon the main living area floor 22. A distal end 132 of the support ribs 122 extend to be aligned with the lower surface 127 of the support ledge.

The ramped floor portion 68 shown in FIG. 14 includes an outer leg that has an offset upper portion 44 its lower portion 42 and functions in the same way as the upper portion of FIGS. 8-13.

Figure 11:
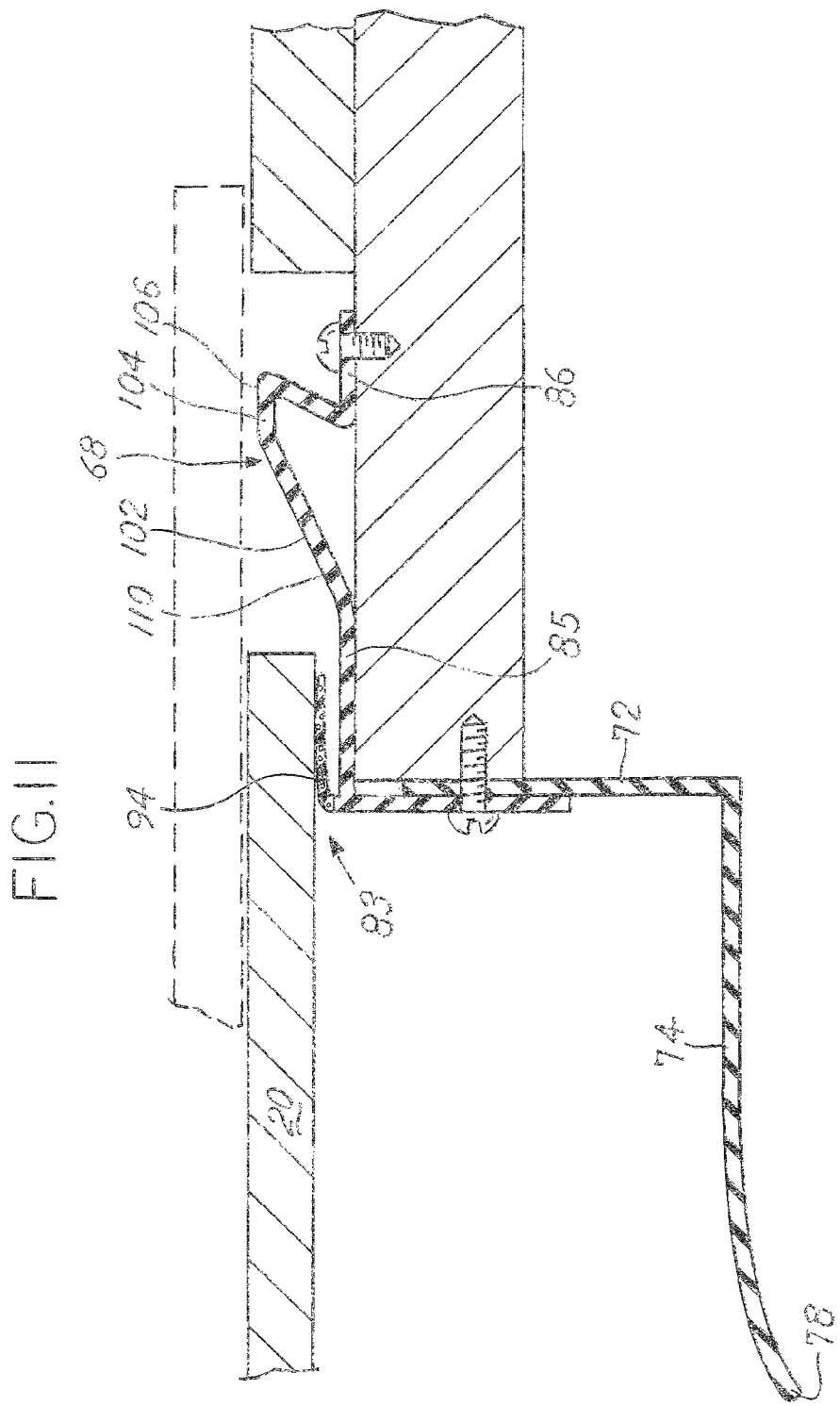
FIG. 11 is a side view of the slide out room in an extended position.

As the slide-out room 12 moves between the extended and retracted position, the floor 20 slides on the upper portion 44 as shown in FIG. 2, forming a seal. As is shown in FIG. 11, if the slide out room 12 has a drop-down floor, the ramped surface 110 allows the floor 20 to smoothly transition from a position where it overlays the main floor 22 to a position where an upper surface of the floor 20 is aligned with the main floor 22. When the slide-out room is refracted, the ramped surface 110 allows the floor 20 to smoothly transition to a position where it overlays the main floor 22.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A seal for living quarters having main living area walls and a main living area floor defining a main living area, said main living area floor having a lateral edge, an aperture in one of said main living area walls slidably receiving a slide out room having slide out room walls and a second floor defining an auxiliary living space, said slide out room capable of movement between a retracted and an extended position, said second floor adapted for slidably overlaying said main living area floor and separated therefrom, said seal comprising:
a floor portion formed from a single member, and a splash portion formed from a single member;
the floor portion comprising: an inward flange and an outward flange, said inward flange having a lower surface and an upper surface, said outward flange having a lower surface and an upper surface, said lower surface of said outward flange being substantially parallel with said lower surface of said inward flange, a wear bar integrally attached between said inward flange and said outward flange, said wear bar having an outward upright wall extending upwardly from said outward flange at a first terminal end of said outward flange in a direction opposite said lower surface of said outward flange, said outward upright wall terminating at an outer terminal end of a top wall, said wear bar having an inward upright wall extending upwardly from said inward flange at a first terminal end of said inward flange in a direction opposite said lower surface of said inward flange, said inward upright wall terminating at an inner terminal end of said top wall, said top wall being spaced from said inward and outward flanges, an exterior leg attached at a second terminal end of said outer flange at a point intermediate to its ends, said exterior leg having a lower portion extending in an opposite direction of said wear bar below said lower surfaces of said inner and outer flanges and said lower portion being substantially perpendicular to said outer flange, said exterior leg including an upper portion being located above said outer flange said upper portion being more flexible than said lower portion;
the splash portion being generally L-shaped and comprising: a mounting leg and a sealing leg that is substantially perpendicular to said mounting leg, said sealing leg having a portion nearest a distal end of said sealing leg being more flexible than said mounting leg; and
said lower portion of said exterior leg adapted to overlay a portion of said mounting leg of said splash portion, a portion of said upper portion and said wear bar adapted to contact a lower surface of said second floor.

2. The seal of claim 1, wherein the upper portion of said outer leg extends above said wear bar.

3. The seal of claim 2, wherein said outward upright wall has an upper surface being obtusely angled with respect to said lower surface of said outward flange.

4. The seal of claim 1, wherein said inward and outward flanges are connected by a bridge.

5. The seal of claim 4, further comprising a rib located between said inward and outward upright walls connecting said top to said bridge.

6. The seal of claim 1, wherein said outward upright wall has an upper surface being obtusely angled with respect to said lower surface of said outward flange and said top includes a rib located between said inward and outward upright walls, extending downwardly toward either of said outward or inward flanges, and said rib including an end substantially aligned with one of said inward or outward flanges.

7. The seal of claim 1, further comprising an elongate support member adapted for fitting within said wear bar and supporting the same, said elongate support member including a rib adapted for contacting said main living area floor.

8. The seal of claim 7, wherein said elongate support member includes a support flange, and said rib includes an end extending to lower surface of said support flange.

9. The seal of claim 1, wherein said outward upright wall has an upper surface obtusely angled with respect to said lower surface of said outward flange.

10. The seal of claim 8, wherein said inward upright wall is acutely angled with respect to said lower surface of said inward flange.

11. A seal for living quarters having main living area walls and a main living area floor defining a main living area, said main living area floor having a lateral edge, an aperture in one of said main living area walls slidably receiving a slide out room having slide out room walls and a second floor defining an auxiliary living space, said slide out room capable of movement between a retracted and an extended position, said second floor adapted for slidably overlaying said main living area floor and separated therefrom, said seal comprising:
- a floor portion formed from a single member, and a splash portion formed from a single member;
- the floor portion comprising: an inward flange and an outward flange, said inward flange having a lower surface and an upper surface, said outward flange having a lower surface and an upper surface, said lower surface of said outward flange being substantially parallel with said lower surface of said inward flange, a wear bar integrally attached between said inward flange and said outward flange, a wear bar integrally attached between said inward flange and said outward flange, said wear bar including upright members opposite each other extending from said inward and outward flanges at their corresponding first terminal ends in a direction opposite said lower surfaces of said inward and outward flanges, said upright members being substantially perpendicular to said lower surfaces of said inward and outward flanges, said upright members terminating in a top spanning both of said upright members, said top having a lower surface, an exterior leg attached at a second terminal end of said outer flange at a point intermediate to its ends and being substantially perpendicular to said outer flange, said exterior leg having a lower portion extending in an opposite direction of said wear bar below said lower surfaces of said inner and outer flanges, said exterior leg including an upper portion being located above said outer flange, said upper portion being more flexible than said lower portion;
- the splash portion being generally L-shaped and comprising: a mounting leg and a sealing leg that is substantially perpendicular to said mounting leg, said sealing leg having a portion nearest a distal end of said sealing leg being more flexible than said mounting leg; and
- said lower portion of said floor portion adapted to overlay a portion of said mounting leg of said splash portion, a portion of said upper portion and said wear bar adapted to contact a lower surface of said second floor.

12. The seal of claim 11, further comprising a strut extending from said lower surface of said top toward said lower surfaces of said flanges and being connected to a bridge joining said inner and outer flanges.

13. The seal of claim 12, wherein said top includes a ramped wall being obtusely angled with respect to said lower surface of said outward flange.

14. The seal of claim 13, wherein said inward member is acutely angled with respect to said lower surface of said inward flange.

15. The seal of claim 11, further comprising a mechanical fastener driven through said lower portion of said exterior leg and said mounting leg for attaching said floor portion and said splash portion to said main living area floor.

16. The seal of claim 15, wherein said mounting leg of said splash portion is adapted to overlay and directly contact said lateral edge of said main living area floor.

17. The seal of claim 16, wherein said lower surface of said inward and outward flange is adapted to overlay and directly contact an upper surface of a portion of said main living area floor.

18. The seal of claim 11, wherein said distal end of said sealing leg is adapted to contact said end wall of said slide out room when said slide out room is in said retracted position.

19. The seal of claim 18, wherein said lower portion of said floor portion and said mounting leg of said splash portion are adapted for simultaneously receiving a mechanical fastener.

* * * * *